United States Patent
Kim

(10) Patent No.: US 7,116,936 B2
(45) Date of Patent: Oct. 3, 2006

(54) METHOD AND APPARATUS FOR ESTIMATING BEACON POWER VARIATIONS

(75) Inventor: In-Kyung Kim, N. Potomac, MD (US)

(73) Assignee: Hughes Network Systems, Inc., Germantown, MD (US)

( * ) Notice: Subject to any disclaimer, the term of this patent is extended or adjusted under 35 U.S.C. 154(b) by 568 days.

(21) Appl. No.: 10/430,868

(22) Filed: May 7, 2003

(65) Prior Publication Data

US 2004/0224634 A1   Nov. 11, 2004

(51) Int. Cl.
 *H04B 7/185*   (2006.01)
(52) U.S. Cl. ............... 455/13.4; 455/12.1; 455/427; 370/316; 370/318
(58) Field of Classification Search ............... 455/12.1, 455/13.1–13.4, 427–430; 370/316, 318
See application file for complete search history.

(56) References Cited

U.S. PATENT DOCUMENTS

| | | | | |
|---|---|---|---|---|
| 4,941,199 A | * | 7/1990 | Saam | 455/10 |
| 5,422,909 A | * | 6/1995 | Love et al. | 375/147 |
| 6,496,682 B1 | * | 12/2002 | Butte et al. | 455/12.1 |
| 2003/0072277 A1 | * | 4/2003 | Subrahmanya et al. | 370/320 |

* cited by examiner

*Primary Examiner*—Edward F. Urban
*Assistant Examiner*—Raymond S. Dean
(74) *Attorney, Agent, or Firm*—Craig Plastrik

(57) ABSTRACT

A method for compensating for power variations in satellite communications includes measuring or estimating power variations for signals received at an earth-based terminal. The method also includes measuring or estimating changes in carrier-to-noise levels by a number of satellite terminals. The power variations may then be used to adjust the measured/estimated changes in carrier-to-noise (C/N) levels. The adjusted C/N levels may then be used to more accurately reflect actual network conditions and may be used in downlink power control related processing.

14 Claims, 10 Drawing Sheets

100

110

120

120

NETWORK OPERATIONS CENTER
130

METHOD AND APPARATUS FOR ESTIMATING BEACON POWER VARIATIONS

BACKGROUND OF THE INVENTION

1. Field of the Invention

The present invention relates generally to satellite communications and, more particularly, to estimating beacon power variations in satellite communications.

2. Description of Related Art

In satellite communications, a satellite periodically transmits a beacon signal to earth-based satellite terminals. The beacon signals may be used by the satellite terminals in establishing communications with the satellite. Each satellite terminal may also determine the carrier-to-noise (C/N) ratio of the beacon signal for use in downlink power control (DLPC) related processing.

One problem with using the C/N ratio of the beacon signal in DLPC related processing is that the beacon power (e.g., the effective isotropic radiated power (EIRP)) may vary during the course of each day and may also vary over time (i.e., with the age of the satellite). In such a case, the variation in beacon power may be considered to be noise, the result of rain or some other problem. These variations in beacon power may adversely impact the DLPC related processing. For example, in some systems, beacon power variations may result in determining that the satellite must increase power levels for transmissions to one or more cells. Such increases in transmission power levels may reduce the efficiency associated with managing the satellite's power resources and may lead to availability reductions in situations which require efficient control of the satellite's power resources.

Therefore, a need exists for systems and methods that estimate beacon power variations and adequately compensate for these variations.

SUMMARY OF THE INVENTION

Systems and methods consistent with the present invention address these and other needs by measuring beacon C/N ratios over a period of time and filtering these C/N ratios to estimate beacon power variations. The estimated beacon power variations may then be taken into consideration in DLPC related processing.

In accordance with the principles of the invention as embodied and broadly described herein, a device that includes a receiver and at least one logic device is provided. The receiver is configured to receive beacon signals transmitted from a satellite and the logic device is coupled to the receiver. The logic device includes a carrier-to-noise (C/N) calculator, a first filter, a second filter and a beacon variation estimator. The C/N calculator is configured to calculate C/N values associated with the beacon signals. The first filter is configured to filter the C/N values to generate a first output and the second filter is configured to filter the C/N values to generate a second output. The beacon variation estimator is configured to determine a difference between the first output and the second output, wherein the difference represents an estimated beacon power variation.

In another implementation consistent with the present invention, a computer-readable medium having stored sequences of instructions is provided. The instructions when executed by at least one processor cause the processor to receive a plurality of carrier-to-noise (C/N) values representing beacon C/N values and filter the plurality of C/N values using a first filtering process. The instructions also cause the at least one processor to determine a difference between an output of the first filtering process and a clear sky reference value, where the difference represents an estimated beacon power variation.

In still another implementation consistent with the present invention, a method for estimating power variations for signals transmitted from a satellite is provided. The method includes receiving a plurality of beacon signals at an earth-based terminal and estimating carrier-to-noise (C/N) values associated with the beacon signals. The method also includes filtering the C/N values to generate a first output and comparing the first output with a clear sky C/N reference value at predetermined intervals to generate beacon power variation information.

In a further implementation consistent with the present invention, a method for compensating for power variations in transmissions from a satellite is provided. The method includes generating, by at least one earth-based satellite terminal, power variation information associated with transmissions from the satellite. The method also includes averaging the power variation information over at least one of a period of time and a number of earth-based satellite terminals. The method further includes determining transmission power levels for the satellite using the averaged power variation information.

BRIEF DESCRIPTION OF THE DRAWINGS

The accompanying drawings, which are incorporated in and constitute a part of this specification, illustrate the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

Systems and methods consistent with the present invention estimate beacon power variations. The beacon power variations may then be used in DLPC related processing.

Exemplary Network

Figure 1:
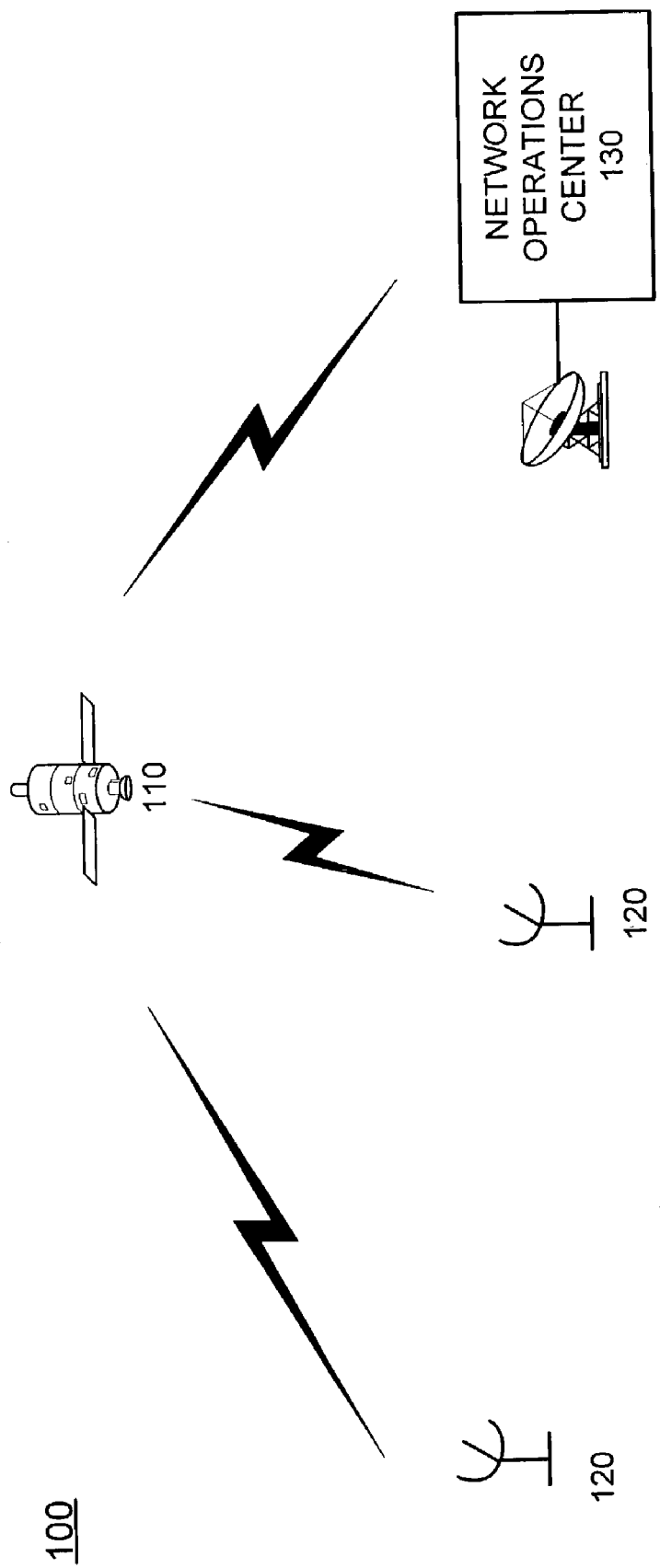
FIG. 1 is a diagram of an exemplary network in which methods and systems consistent with the present invention may be implemented.

FIG. 1 illustrates an exemplary network in which methods and systems consistent with the present invention may be implemented. Network 100 includes a satellite 110, a number of satellite terminals 120 (also referred to as terminals 120) and a network operations center 130. The number of components illustrated in FIG. 1 is provided for simplicity. It will be appreciated that a typical network 100 may include more or fewer components than are illustrated in FIG. 1.

Satellite 110 may support two-way communications with earth-based stations, such as satellite terminals 120 and network operations center 130. Satellite 110 may include one or more downlink antennas and one or more uplink antennas for transmitting data to and receiving data from earth-based stations, such as satellite terminals 120 and network operations center 130. Satellite 110 may also include transmit circuitry to permit the satellite 110 to use the downlink antenna(s) to transmit data using various ranges of frequencies. For example, satellite 110 may transmit data in the Ka frequency band ranging from about 17–31 GHz. Satellite 110 may also support transmissions in other frequency ranges. Satellite 110, via its uplink antenna(s), may receive uplink information transmitted on any number of frequencies from the earth-based stations.

Figure 2:
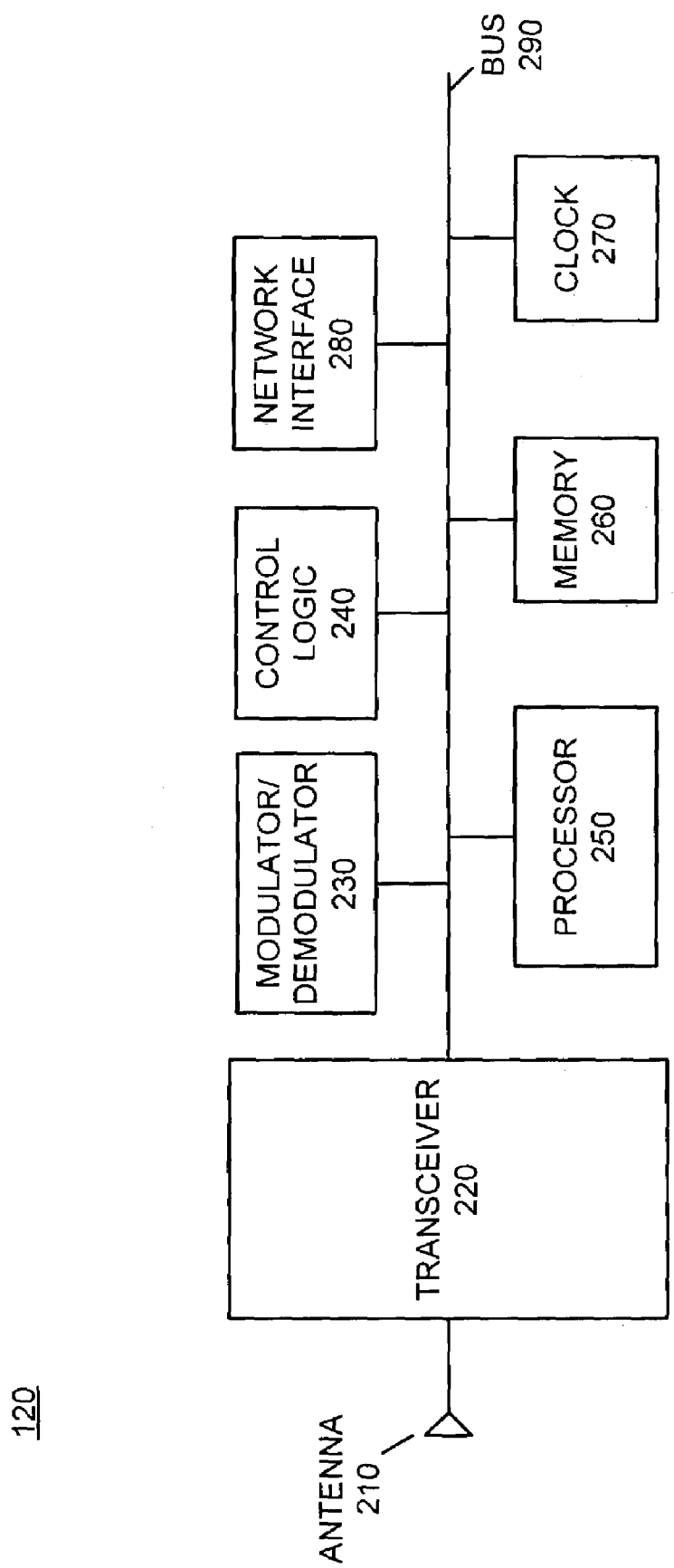
FIG. 2 is a diagram of an exemplary satellite terminal of FIG. 1 in an implementation consistent with the present invention.

Satellite terminals 120 allow users to receive information transmitted via satellite 110, such as television programming, Internet data, etc., and to transmit information to other earth-based stations via satellite 110. FIG. 2 illustrates an exemplary configuration of a satellite terminal 120 consistent with the present invention. Referring to FIG. 2, satellite terminal 120 includes antenna 210, transceiver 220, modulator/demodulator 230, control logic 240, processor 250, memory 260, clock 270, network interface 280 and bus 290.

Antenna 210 may include one or more conventional antennas capable of transmitting/receiving signals via radio waves. For example, antenna 210 may receive data transmitted from satellite 110 in the Ka frequency band. Antenna 210 may also receive information transmitted in other frequency bands. Antenna 210 may also transmit data from satellite terminal 120 to satellite 110 using any number of frequencies.

Transceiver 220 may include well-known transmitter and receiver circuitry for transmitting and/or receiving data in a network, such as network 100. Modulator/demodulator 230 may include conventional circuitry that combines data signals with carrier signals via modulation and extracts data signals from carrier signals via demodulation. Modulator/demodulator 230 may also include conventional components that convert analog signals to digital signals, and vice versa, for communicating with other devices in terminal 120. Modulator/demodulator 230 may further include circuitry for measuring the power level associated with a beacon signal transmitted from satellite 110, as described in detail below.

Control logic 240 may include one or more logic devices, such as an application specific integrated circuit (ASIC), that control the operation of terminal 120. For example, control logic 240 may include logic circuitry used to determine a clear sky C/N reference value and estimate beacon power variations, as described in more detail below Processor 250 may include any type of conventional processor or microprocessor that interprets and executes instructions. Processor 250 may perform data processing functions relating to establishing a clear sky C/N reference value and estimating beacon power variations, as described in more detail below.

Memory 260 may provide permanent, semi-permanent, or temporary working storage of data and instructions for use by processor 250 in performing processing functions. Memory 260 may include a conventional random access memory (RAM) or another dynamic storage device that stores information and instructions for execution by processor 250. Memory 260 may also include a conventional read only memory (ROM), an electrically erasable programmable read only memory (EEPROM) or another static or non-volatile storage device that stores instructions and information for use by processor 250. Memory may further include a large-capacity storage device, such as a magnetic and/or optical recording medium and its corresponding drive.

Clock 270 may include conventional circuitry for performing timing-related operations associated with one or more functions performed by terminal 120. Clock 270 may include, for example, one or more oscillators and one or more counters.

Network interface 280 may include an interface that allows terminal 120 to be coupled to an external network. For example, network interface 280 may include a serial line interface, an Ethernet interface for communicating to a local area network (LAN), an asynchronous transfer mode (ATM) network interface and/or an interface to a cable network. Alternatively, network interface 280 may include other mechanisms for communicating with other devices and/or systems.

Bus 290 may include one or more conventional buses that interconnect the various components of terminal 120 to permit the components to communicate with one another. The configuration of terminal 120, shown in FIG. 2, is provided for illustrative purposes only. One skilled in the art will recognize that other configurations may be employed. Moreover, one skilled in the art will appreciate that a typical terminal 120 may include other devices that aid in the reception, transmission, or processing of data.

Terminal 120, consistent with the present invention, performs processing relating to estimating variations in beacon power. Terminal 120 may perform such processing, described in detail below, in response to processor 250 executing sequences of instructions contained in a computer-readable medium, such as memory 260. It should be understood that a computer-readable medium may include one or more memory devices and/or carrier waves. The instructions may be read into memory 260 from another computer-readable medium or from a separate device via network interface 280. Execution of the sequences of instructions contained in memory 260 causes processor 250 to perform the process steps that will be described hereafter. In alternative embodiments, hard-wired circuitry may be used in place of or in combination with software instructions to implement the present invention. For example, control logic 240 and/or modulator/demodulator 230 may perform one or more of the processes described below. In still other alternatives, various acts may be performed manually, without the use of terminal 120. Thus, the present invention is not limited to any specific combination of hardware circuitry and software.

Referring back to FIG. 1, network operations center 130 may perform resource management services associated with network 100. For example, network operations center 130 may transmit data to and receive data from terminals 120 via satellite 110. Network operations center 130 may also control operations of satellite 110. For example, network operations center 130 may receive data from satellite terminals 120 and determine the appropriate power levels associated with transmitting data to satellite terminals 120. Network operations center 130 may then transmit uplink information to satellite 110 regarding downlink power control, as described in more detail below.

Figure 3:
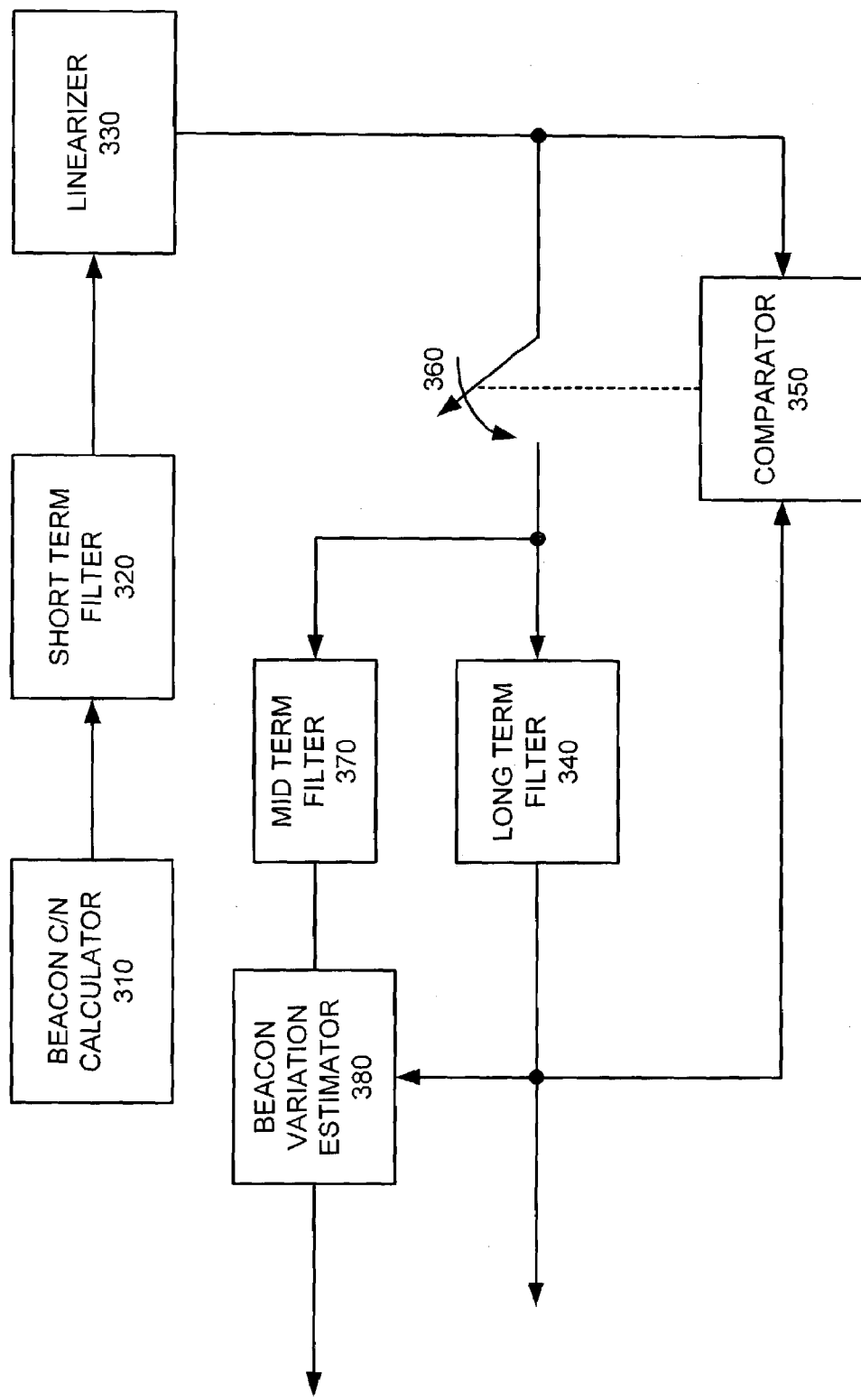
FIG. 3 is a block diagram illustrating exemplary functional logic blocks implemented in the satellite terminal of FIG. 2 in an implementation consistent with the present invention.

FIG. 3 is a functional block diagram illustrating logic for estimating beacon variations according to an implementation consistent with the present invention. Referring to FIG. 3, beacon calculator 310, short term filter 320, linearizer 330, long term filter 340, comparator 350, switch 360, mid-term filter 370 and beacon variation estimator 380 may be implemented in control logic 240 and/or by processor 250 executing instructions stored in memory 260 and/or by other devices in terminal 120.

Beacon C/N calculator 310 may receive a beacon signal from satellite 110 and calculate the C/N value associated with the beacon signal (also referred to as signal-to-noise ratio (SNR)). For example, satellite 110 may transmit a beacon signal every predetermined period of time, such as every 3 milliseconds (ms). The beacon signal may be used by terminals 120 to facilitate establishing communications with satellite 110. Beacon C/N calculator 310 may determine the C/N ratio for the received beacon signals.

For example, in one implementation consistent with the present invention, beacon C/N calculator 310 may measure/estimate the SNR using equation 1 below.

$$SNR = \frac{P_s}{|RSS - P_s|}, \quad \text{Equation (1)}$$

where $P_s$ represents the estimated signal power and the received signal strength (RSS) represents the total power of the received signal (i.e., the sum of the signal power ($P_s$) and the noise power ($P_n$)). RSS, consistent with the present invention, may be defined by equation 2 below.

$$RSS = \frac{1}{N}\sum_{i=0}^{N-1} |r_i|^2 \approx P_s + P_n, \quad \text{Equation (2)}$$

where N=total number of samples and $r_i = s_i + n_i$, where $r_i$ represents the received signal at sample i, $s_i$ represents the signal power at sample i and $n_i$ represents the random noise at sample i. $P_s$, consistent with the present invention, may be defined by equation 3 below.

$$P_s \approx \left|\frac{1}{N}\sum_{i=0}^{N-1} r_i\right|^2 \quad \text{Equation (3)}$$

In this manner, beacon C/N calculator 310 may calculate the C/N value (i.e., the SNR) for the beacon signal. In some implementations, the signal power estimate $P_s$ may be divided over L segments to desensitize performance loss against frequency offset. In alternative implementations, other known processes for estimating/measuring the C/N ratio may be used.

Short term filter 320 may be used to average or filter the C/N values measured over a period of time. For example, short term filter 320 may receive the beacon C/N values and filter the C/N values over a relatively short time period. Short term filter 320 may use any number of filtering/averaging processes to filter the C/N values. In an exemplary implementation, short term filter 320 may be an infinite impulse response (IIR) type filter. In an IIR filter, each sample of an output is the weighted sum of past and current samples of input.

Figure 4:
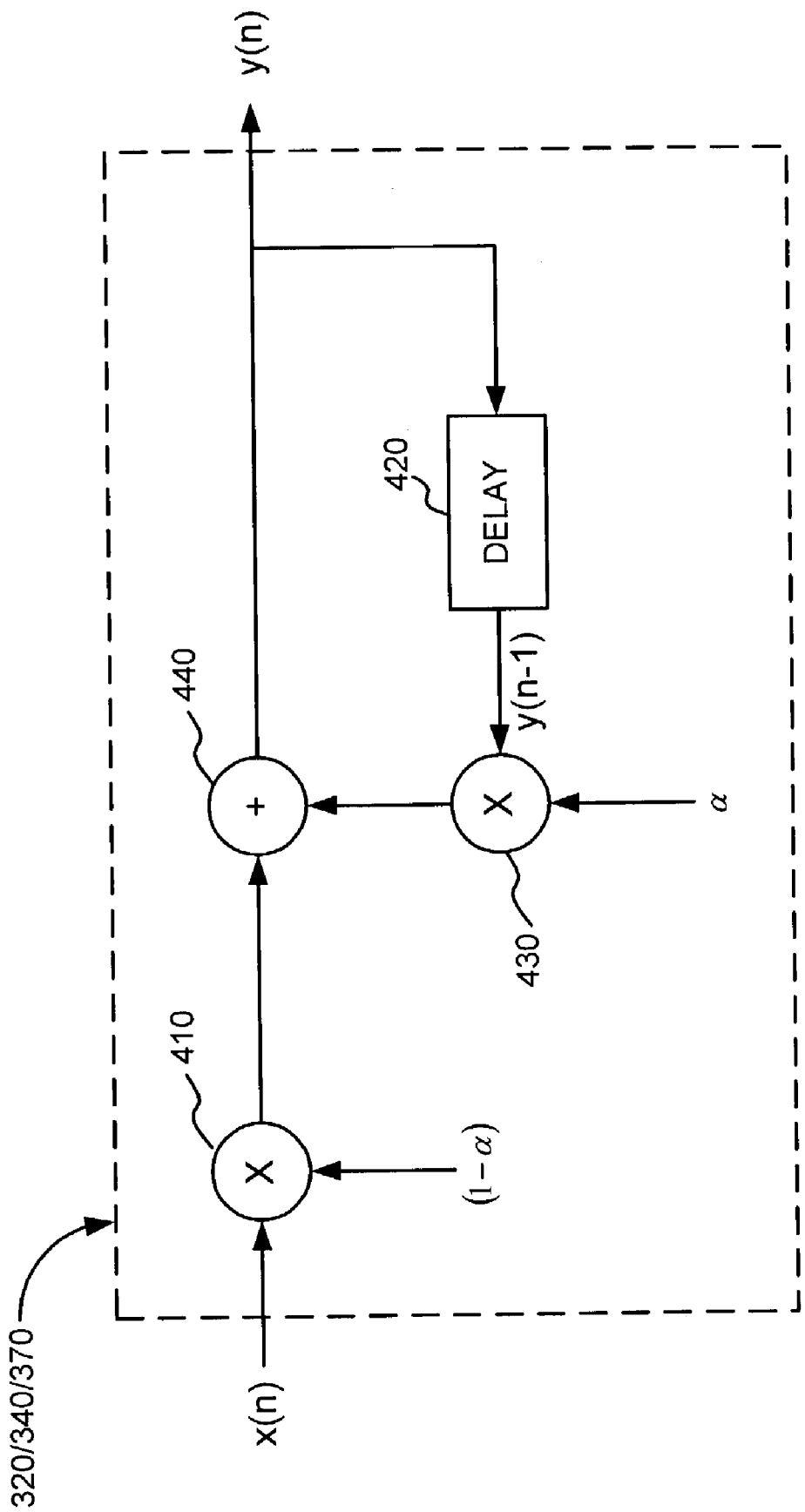
FIG. 4 is a block diagram illustrating the operation of the short term, mid-term and long term filters of FIG. 3 in an implementation consistent with the present invention.

FIG. 4 is an exemplary functional diagram illustrating short term filter 320. Referring to FIG. 4, x(n) represents C/N values input to filter 320 at time "n" and y(n) represents an output of filter 320 at time n. The x(n) input values and the quantity (1−α) are multiplied by multiplier 410, where α represents a filter coefficient. The output y(n) is input to a delay element 420, thereby producing the delayed value y(n−1). The delayed value y(n−1) and the filter coefficient α are multiplied by multiplier 430. The output of multipliers 410 and 430 are then summed by adder 440. In summary, the output of filter 320 can be represented by equation 4 below.

$$y(n) = \alpha y(n-1) + (1-\alpha)x(n) \quad \text{Equation (4)}$$

In an exemplary implementation, the filter coefficient α may be computed using equation 5 below.

$$\alpha = 1 - (T_s/\tau) \quad \text{Equation (5),}$$

where $T_s$ represents a sampling rate of filter 320 and r represents a time constant of filter 320. The sampling rate $T_s$ for short term filter 320 may range from about 3 to 300 milliseconds and the value of τ may range from about 1–300 seconds. In an exemplary implementation the sampling rate $T_s$ may be 96 ms and the time constant τ may be 20 seconds. In this implementation, the value of α may be equal to 1−(0.096 s/20 s) or 0.9952.

Long term filter 340 may be configured in a similar manner as short term filter 320. That is, long term filter 340 may be a single pole IIR type filter as illustrated in FIG. 4, with the output represented by equation 4 above. The sampling rate and time constant of long term filter 340 may be significantly longer than those of short term filter 320. For example, the sampling rate $T_s$ for long term filter 340 may range from about 10 to 20 seconds and the value of τ may range from about 2 hours to about 10 days. In an exemplary implementation, the sampling rate $T_s$ may be 10 seconds and the time constant τ may be seven days for long term filter 340. In this implementation, the value of α is equal to 1−(10 s/(7 days×24 hours/day×3600 s/hour) or 0.99998349. Since long term filter 340 has a large time constant (e.g., 7 days), the sampling rate of 10 seconds provides stable performance for long term filter 340.

As described above, the sampling rate of short term filter 320 may be 96 ms. This value may coincide with the frequency of an uplink message used by terminal 120 to transmit information to satellite 110. It should be understood that other sampling rates and time constants may be used for short term filter 320 and long term filter 340 in implementations consistent with the present invention. In each case, however, the short term filter 320 outputs values representing short term effects on the C/N level, such as rainy weather.

Referring back to FIG. 3, linearizer 330 may receive the output from short term filter 320 and linearize the output. For example, linearizer 320 may receive a number of values output from short term filter 320 over a period of time, such as 10 seconds. Linearizer 330 may remove the bias associated with measurements having higher C/N values. In an exemplary implementation, linearizer 330 may linearize the C/N values received from short term filter 320 using equation 6 below.

$$y = a_0 + a_1 x + a_2 x^2 + a_3 x^3 + a_4 x^4 + a_5 x^5 \qquad \text{Equation (6),}$$

where y represents the linearized output, x represents the input C/N values and $a_0$–$a_5$ represent coefficient values. In an exemplary implementation, $a_0$ may be $1.5124 \times 10^{-1}$, $a_1$ may be $1.0109$, $a_2$ may be $1.3642 \times 10^{-3}$, $a_3$ may be $4.1387 \times 10^{-4}$, $a_4$ may be $-4.9854 \times 10^{-5}$, and $a_5$ may be $2.4539 \times 10^{-6}$. Other values for $a_0$–$a_5$ may be used in alternative implementations of the present invention. The coefficient values $a_0$–$a_5$ may also be configurable via, for example, a message from network operations center 130. That is, network operations center 130 can change the values of coefficients $a_0$–$a_5$ by transmitting a configuration data announcement command to terminals 120. In summary, linearizer 330 compensates for the distortion/error introduced by modulator/demodulator 230 and/or control logic 240 in estimating the C/N value for the beacon signals.

Comparator 350 may receive the output from long term filter 340 and short term filter 320 (via linearizer 330) and compare the outputs to determine a difference. More particularly, comparator 350 may subtract the output of linearizer 330 from the output of long term filter 340 to determine a difference or delta between the C/N values (i.e., $\Delta$C/N, also referred to as $\Delta$SNR). If the difference is less than a threshold value, comparator 350 closes switch 360. In an exemplary implementation consistent with the present invention, the threshold value may be 0.5 dB. Comparator 350 may compare the output of long term filter 340 and short term filter 320 every predetermined period of time, e.g., every 10 seconds to determine whether switch 360 is to be closed or opened. When the $\Delta$C/N value is less than the threshold value, switch 360 is closed and the beacon C/N values will be input to long term filter 340 to contribute to determining a clear sky C/N reference value. When the $\Delta$C/N value is greater than the threshold value, switch 360 is opened and the beacon C/N values will not be input to long term filter 340 and will not contribute to determining a clear sky C/N reference value.

Mid-term filter 370 may be configured in a similar manner as short term filter 320. That is, mid-term filter 370 may be a single pole IIR type filter as illustrated in FIG. 4, with the output represented by equation 4 above. Mid-term filter 370 may be used to estimate variations in beacon power, as described in more detail below. Since beacon power variations may have sharp transitions, the time constant of mid-term filter 370 should be considerably smaller than the time constant of long term filter 340. For example, the time constant $\tau$ of mid-term filter 370 may range from about 30 seconds to about 60 minutes. The sampling rate $T_s$ for mid-term filter 370 may range from about 1 to 30 seconds. In an exemplary implementation, the sampling rate $T_s$ may be 10 seconds and the time constant $\tau$ may be 5 minutes for mid-term filter 370. In this implementation, the value of $\alpha$ is equal to $1 - (10 \text{ s}/(5 \text{ minutes} \times 60 \text{ s/min})$ or $0.96667$. The sampling rate of 10 seconds also provides stable performance for mid-term filter 370.

Beacon variation estimator 380 receives inputs from long term filter 340 and mid-term filter 370 and outputs a value representing the beacon variation. For example, beacon variation estimator 380 may subtract the output of mid-term filter 370 from the output of long term filter 340. This value may represent the estimated beacon effective isotropic radiated power (EIRP) variation, referred to as $\delta$EIRP.

As described previously, the functional blocks in FIG. 3 may be implemented in hardware, software or combinations of hardware and software. In one implementation, beacon C/N calculator 310 may be implemented in hardware, such as control logic 240 and/or modulator/demodulator hardware 230. Control logic 240 and modulator/demodulator may be implemented, for example, in one or more ASIC devices. The other functional blocks in FIG. 3 may be implemented by processor 250 (FIG. 2) executing sequences of instructions stored in memory 260. It should be understood, however, that the functional blocks illustrated in FIG. 3 may alternatively be implemented in other combinations of hardware/software.

Exemplary Processing

Figure 5:
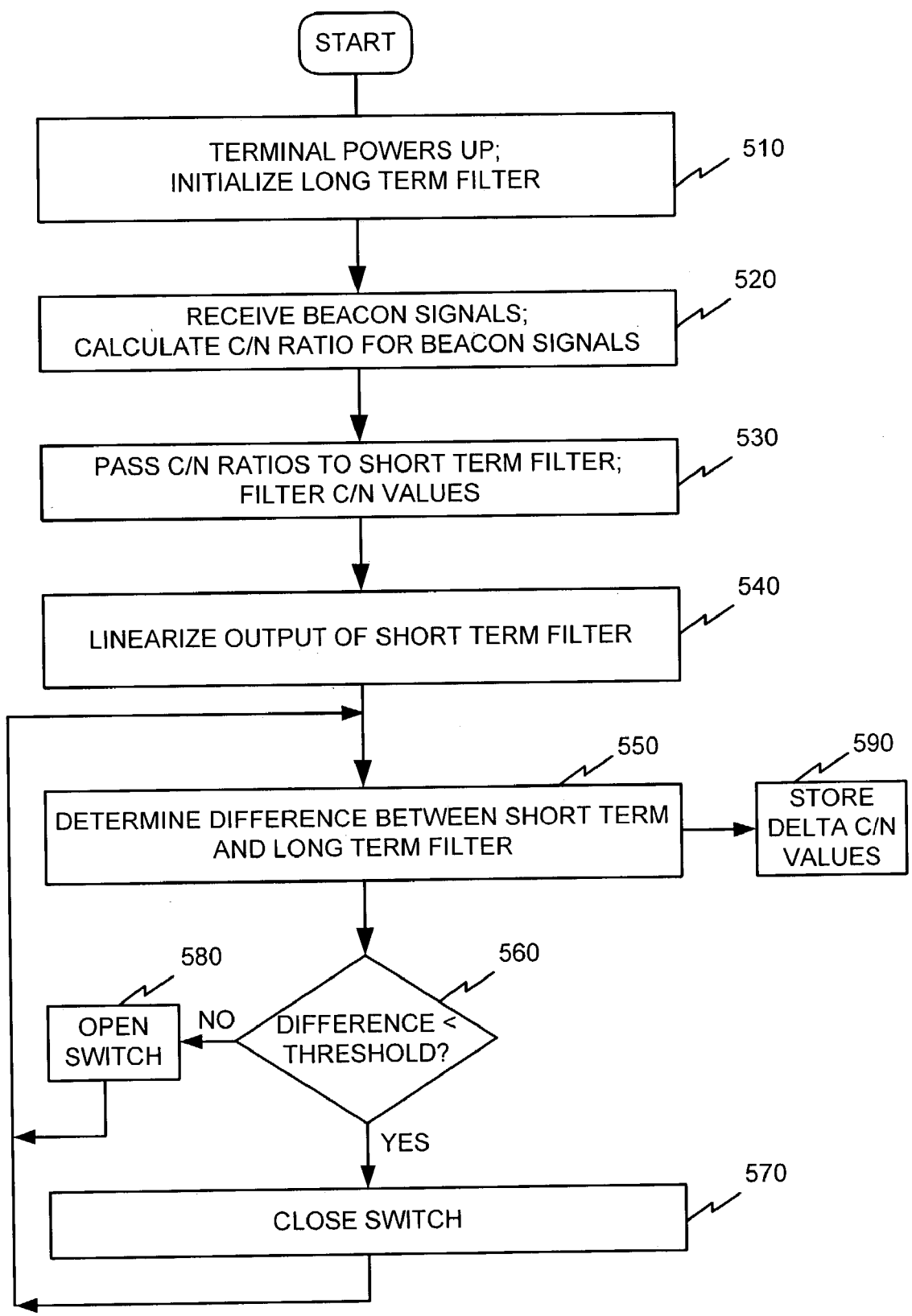
FIGS. 5 and 6 are flow diagrams illustrating exemplary processing associated with estimating a clear sky C/N reference value and estimating beacon power variations in an implementation consistent with the present invention.
Figure 6:
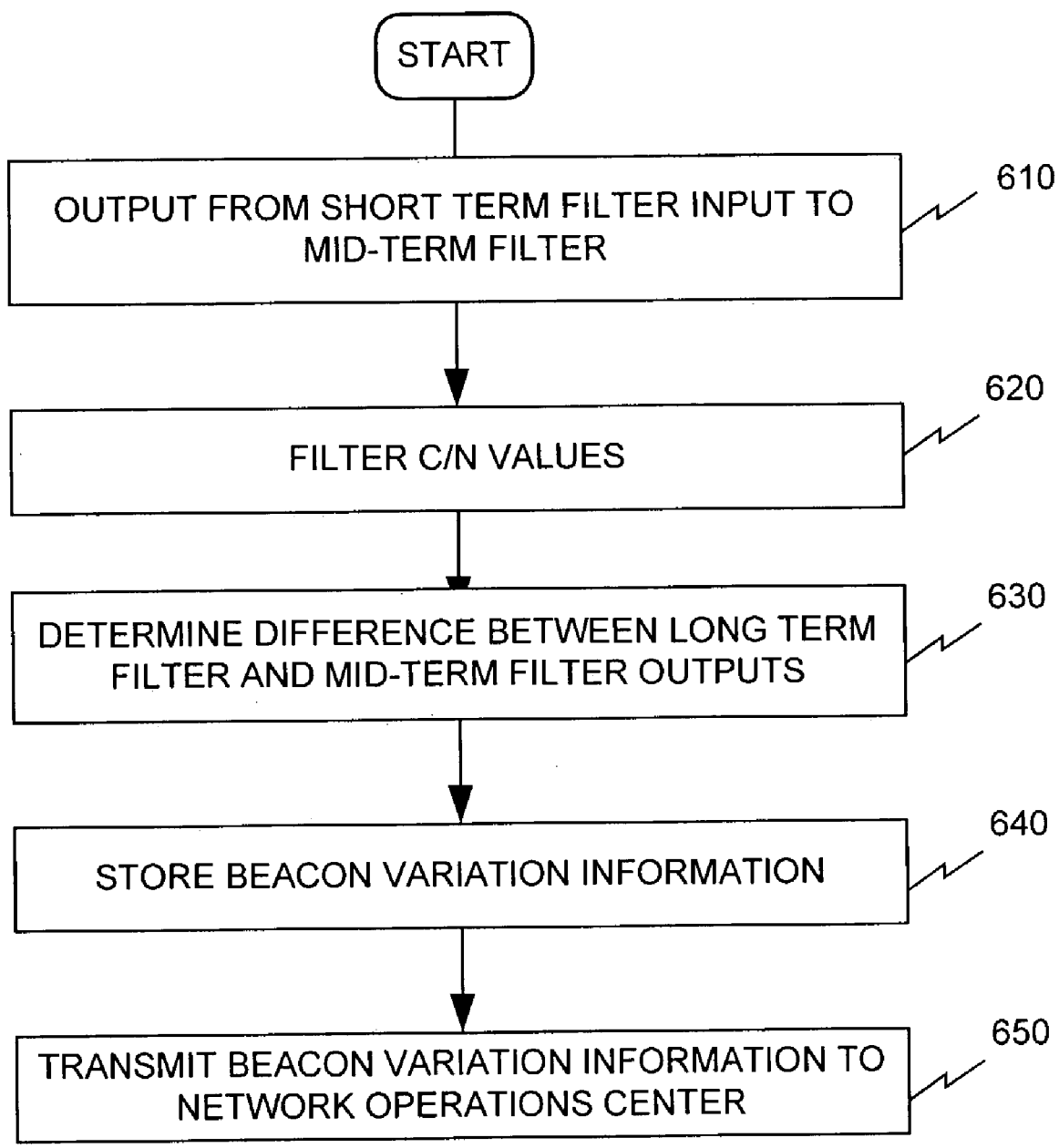

FIGS. 5 and 6 illustrate exemplary processing consistent with the present invention for generating a clear sky reference value and using the clear sky reference value to estimate beacon EIRP variations. The beacon EIRP variations may then be used to facilitate downlink power control related processing. Processing may begin when terminal 120 is installed at a user site and powers on for the first time (act 510). After terminal 120 powers, long term filter 340 may be initialized (act 510). Long term filter 340 may be initialized with a value stored in non-volatile memory, such as memory 260 (FIG. 2). The particular value may be stored in non-volatile memory at the time terminal 120 is manufactured. In other implementations, long term filter 340 may be initialized when terminal 120 is installed at a user site with a value transmitted from network operations center 130 via satellite 110. In either case, the initial value of long term filter 340 may be selected such that the value is below an expected clear sky C/N reference value. The initial value of long term filter 340 is also selected to facilitate long term filter's 340 convergence to the true clear sky C/N value in a reasonable period of time, such as 30 days. In an exemplary implementation, long term filter 340 may be initialized with a value of 5.5 dB. Other values may also be used in alternative implementations. Processing associated with initializing long term filter 340 is described in more detail in U.S. patent application Ser. No. 10/401,088, entitled "Method and Apparatus for Establishing a Clear Sky Reference Value," assigned to the assignee of the present invention, the entire disclosure of which is hereby incorporated herein by reference.

Terminal 120 continues with an initialization process to establish communication with satellite 110. For example, as described previously, satellite 110 may transmit a beacon signal every predetermined period of time. The beacon signal may be used by all receiving terminals to aid in the initialization process associated with receiving data from satellite 110. Assume that terminal 120 receives the beacon signal from satellite 110 every predetermined period of time (act 520). Beacon C/N calculator 310 may then determine the C/N value for the received beacon signals (act 520). More particularly, beacon C/N calculator 310 may measure/estimate the SNR of the beacon signals using equations 1–3 discussed above. In alternative implementations, other known processes for estimating/measuring the SNR may be used. Beacon C/N calculator 310 may make this measurement every predetermined period of time, such as every 96 ms. Alternatively, beacon calculator 310 may make C/N measurements at other predetermined intervals and other known processes for estimating/measuring the C/N value may be used.

Beacon C/N calculator 310 forwards the C/N values to short term filter 320. Short term filter 320 may then average or filter the received C/N values (act 530). More particularly, in an exemplary implementation consistent with the present invention, short term filter 320 applies an IIR type filtering process to filter the C/N values, as described above with respect to FIG. 4. For example, as discussed previously, short term filter 320 may filter the input values x(n) to produce an output y(n) represented by equation 4 above. As described above with respect to FIG. 4, in an exemplary implementation, the time constant τ of short term filter 320 may be 20 seconds and the sampling rate $T_s$ may be 96 ms (i.e., the rate at which short term filter 320 is supplied with C/N values from beacon C/N calculator 310), with the filter coefficient being 0.9952. This sampling rate and time constant allow short term filter 320 to filter C/N values over a relatively short time period.

Short term filter 320 may then output the results of the filtering to linearizer 330. Linearizer 330 may linearize a number of C/N values output from short term filter 320 to remove the distortion or bias associated with C/N measurements having higher C/N values (act 540). In an exemplary implementation consistent with the present invention, linearizer 330 may sample the output of short term filter 320 every predetermined period of time, such as every 10 seconds. Linearizer 330 may then linearize these samples using equation 6 above.

In some implementations, linearizer 330 may not be needed and the output of short term filter 320 may be input directly to comparator 350. For example, if the C/N values do not exhibit distortion or compression as a result of the C/N measuring logic, linearizer 330 may be bypassed.

In either case, comparator 350 receives the output of long term filter 340 and the output from short term filter 320 (either via linearizer 330 or directly). Comparator 350 may then determine the difference between these values to generate a ΔC/N value (act 550). In an exemplary implementation, comparator 350 may subtract the current output of short term filter 320 (linearized output if linearizer 330 is used) from the current output of long term filter 340 every predetermined period of time, such as every 10 seconds. In alternative implementations, the predetermined period of time may be shorter or longer.

Comparator 350 may also determine whether the difference between the current output of the long term filter 340 and the current output of the short term filter 320 is less than a predetermined threshold (act 560). In an exemplary implementation, the threshold is 0.5 dB. Other threshold values may be used in alternative implementations. If the ΔC/N value is less than the threshold value, switch 360 may be closed (act 570). In this case, the output of short term filter 320 (via linearizer 330 if appropriate) may be fed to the input of long term filter 340. In other words, the beacon C/N values from short term filter 320 may be used by long term filter 340 to generate the clear sky C/N value. The output from long term filter 340 represents the clear sky C/N value. The process may then return to act 550, where the processing is repeated every predetermined interval, e.g., every 10 seconds.

If the ΔC/N value is not less than the threshold value, switch 360 is opened or remains open (act 580). In this case, C/N measurements from short term filter 320 are not input to long term filter 340. The process may then return to act 550 and the processing repeats. In this manner, beacon measurements that have a have a relatively low C/N ratio are not fed to long term filter 340 and are therefore not used in generating the clear sky reference value. Such low C/N values may represent C/N values taken under rainy skies. As such, these values would not represent actual clear sky conditions and would lower the clear sky C/N value output from long term filter 340 in an erroneous manner. After a predetermined period of time, during which switch 360 may be closed and opened any number of times, the output of long term filter 340 will converge to the value that represents the clear sky C/N level.

In an exemplary implementation consistent with the present invention, the ΔC/N value is computed each time the long term filter's 340 output is sampled, e.g., every 10 seconds. The most recent output from long term filter 340 may be stored in non-volatile memory, such as memory 260. In this manner, if terminal 120 powers down for some period of time after installation of terminal 120, the current value of long term filter 340 is preserved in non-volatile memory. This current value of long term filter 340 value is then used as the clear sky reference value upon re-starting of terminal 120. In other words, if terminal 120 powers down for some reason, the initial value of long term filter 340 does not revert back to the initial value used at the time of installation of terminal 120 (described with respect to act 510 above). The operation of long term filter 340 merely re-starts with the most recent value output from long term filter 340 being used as the current clear sky C/N value.

After terminal 120 has been operating for a predetermined period of time, long term filter 340 will converge to the true clear sky C/N value. In an exemplary implementation consistent with the present invention, the predetermined period of time may be 30 days. In alternative implementations, it may take long term filter 340 more or less time to converge to the true clear sky C/N value based on the particular system requirements and the value used to initialize long term filter 340. In any event, terminal 120 may set a timer to the predetermined period. If the timer has reached the predetermined value, indicating that terminal 120 has been operating for the predetermined duration, terminal 120 may store ΔC/N values determined by comparator 350 (act 590). Not storing ΔC/N values for a period of time, during which long term filter 340 converges to a value close to the true clear sky C/N value, prevents ΔC/N values that do not accurately represent the true deviation from the clear sky C/N value from being reported to network operations center 130. The stored ΔC/N values may be sent to network operations center 130, as described in more detail below.

As described above, when switch 360 is closed, the output from short term filter 320 is input to long term filter 340. Referring back to FIG. 3, when switch 360 is closed, the output from short term filter 320 is also input to mid-term filter 370, via linearizer 330 if appropriate (FIG. 6, act 610). C/N estimates taken during periods when switch 360 is closed represent clear sky conditions. In an exemplary implementation of the present invention, terminal 120 may be located in a desert-type area so that the terminal 120 is essentially operating under clear sky conditions at all times. In this case, switch 360 would be closed at all times (or nearly all times). In addition, in this environment, the determinations made as to whether switch 360 should be closed (FIG. 5, act 560) may be bypassed and switch 360 may remain closed at all times.

Mid-term filter 370 may then average or filter the C/N values (act 620). More particularly, in an exemplary implementation consistent with the present invention, mid-term filter 370 applies an IIR type filtering process to filter the C/N values, as described above with respect to FIG. 4. For example, as discussed previously, mid-term filter 370 may filter the input values x(n) to produce an output y(n) represented by equation 4 above. In an exemplary implementation consistent with the present invention, the time constant τ of mid-term filter 370 may be 5 minutes and the sampling rate $T_s$ may be 10 seconds, with the filter coefficient being 0.96667. This time constant allows mid-term filter 370 to filter C/N values over a much shorter time period than long term filter 340 and to generate an output that may be used to estimate variations in beacon power levels that are not due to disturbances such as rain.

Mid-term filter 370 outputs its filtered values to beacon variation estimator 380. Beacon variation estimator 380 may then determine the difference between the output of the long term filter (i.e., the clear sky C/N reference value) and the output of mid-term filter 370 (act 630). For example, beacon variation estimator 380 may subtract the output of mid-term filter 370 from the output of long term filter 340 at predetermined intervals. This difference represents the beacon EIRP variation (i.e., δEIRP).

As described above with respect to generating ΔC/N values, the δEIRP values may not accurately represent beacon power variations until terminal 120 has been operating for the predetermined period of time (i.e., until the timer has reached the predetermined value, such as 30 days, indicating that long term filter 340 has converged to the true clear sky C/N value). Therefore, the output of beacon variation estimator 380 may not accurately represent the beacon power variation until the timer has reached the predetermined value. Assume that the timer has reached the predetermined time value. Beacon variation estimator 380 may then store the δEIRP information in memory, such as memory 260 (act 640). The δEIRP information may include time stamp information indicating when the δEIRP determination was made. The beacon EIRP variation information may then be transmitted to network operations center 130 (act 650). For example, the beacon EIRP variations may be transmitted to network operations center 130 at predetermined intervals, such as every 5 minutes. In an alternative implementation, terminal 120 may transmit the data in response to a polling message transmitted from network operations center 130. The beacon EIRP information may be transmitted via satellite 110 or via a dedicated link between terminal 120 and network operations center 130. In another alternative, terminal 120 may store the beacon EIRP variations over a period of time, such as a 24 hour period. Terminal 120 may then transmit a day long time trace of beacon power variation estimates with time stamps to network operations center 130. Network operations center 130 may then use this information to facilitate DLPC related processing, as described in more detail below.

Figure 7:
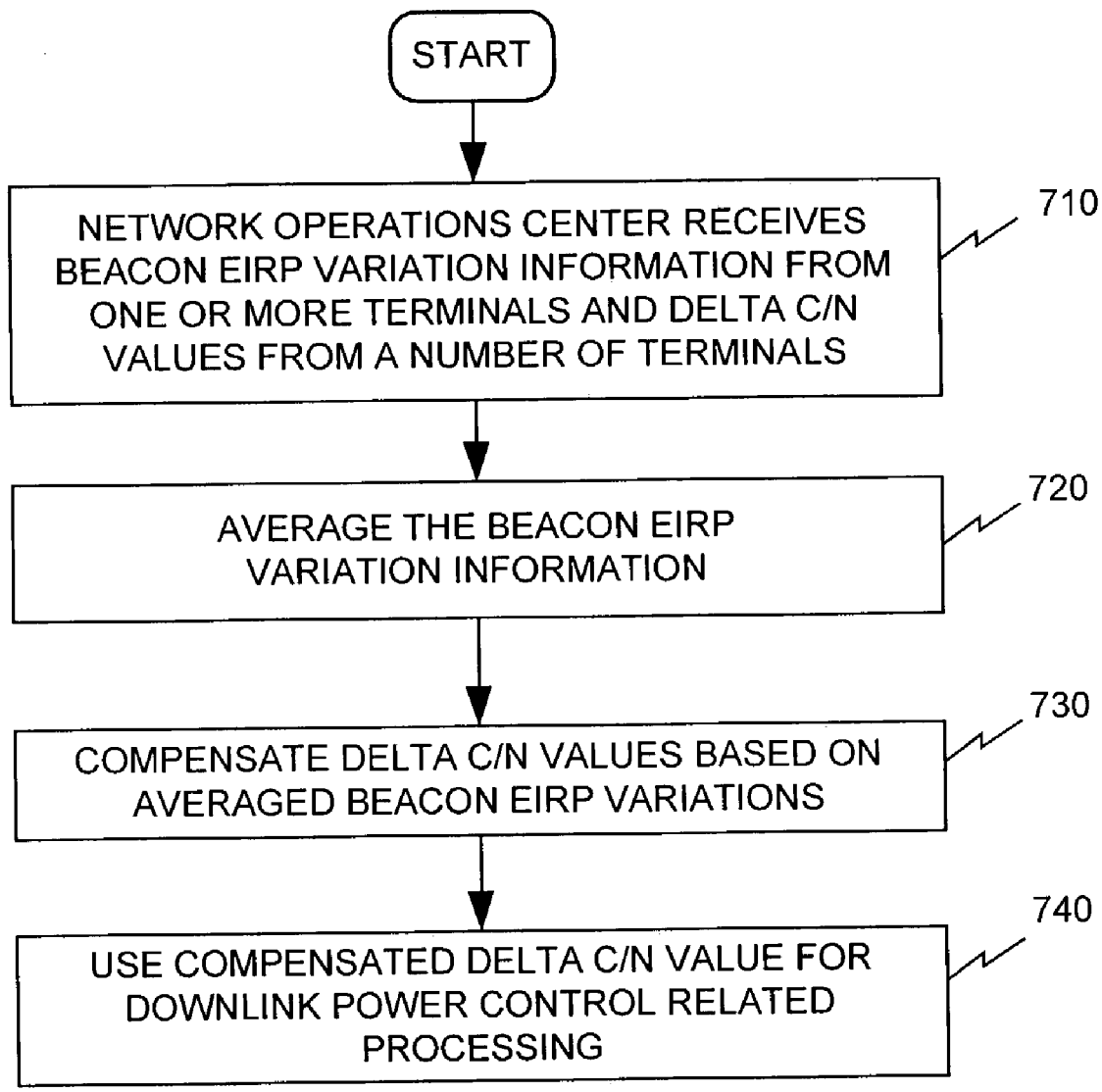
FIG. 7 is a flow diagram illustrating exemplary DLPC processing by the network operations center of FIG. 1 in an implementation consistent with the present invention.

FIG. 7 illustrates exemplary processing relating to using the beacon EIRP variation estimates for downlink power control processing. Processing may begin by network operations center 130 receiving the beacon EIRP variation estimates from terminal 120 (act 710). As described above, the beacon EIRP variation estimates may include beacon EIRP variation estimates taken over a period of time. For example, network operations center 130 may receive a time trace of beacon EIRP variations, such as an N-day time trace, where N may be 1 (i.e., a 24 hour time trace) or more, along with time stamp information. Alternatively, network operations center 130 may receive beacon EIRP variation information transmitted every predetermined interval, such as every 5 minutes.

Network operations center 130 may also receive ΔC/N values transmitted from a number of earth-based terminals, such as terminals 120 (act 720). The ΔC/N values for each of the terminals 120 may be calculated as described above with respect to FIG. 5 (act 550). Not all of the earth-based terminals 120, however, may be used to calculate the beacon δEIRP values. For example, only a selected number of terminals 120 (referred to as probing terminals 120) may be needed to estimate beacon EIRP variations. In addition, in some implementations, the probing terminals 120 may be used to estimate beacon power variations, but may not be needed to forward the ΔC/N values to network operations center 130.

For example, in some implementations consistent with the present invention, the configuration illustrated in FIG. 3 may be simplified. More particularly, mid-term filter 370 and beacon variation estimator 380 may not be needed and short term filter 320 may be reconfigured to have a larger time constant, e.g., the same value intended for mid-term filter 370 described above. In this simplified configuration, ΔC/N values which are determined by comparator 350 may be used as the beacon variation estimates δEIRP. Using this simplified configuration, short term filter 320 acts as the mid-term filter and therefore, the terminal may be able to report beacon variation estimates δEIRP, but not ΔC/N values. In other words, in this simplified configuration, the probing terminal loses the capability to report ΔC/N values.

Network operations center 130 may then average the beacon EIRP variation information (act 720). For example, network operations center 130 may average the beacon EIRP variation estimates taken over a several day period, exploiting the fact that the beacon EIRP variations are diurnal, (i.e., vary periodically over the course of each day).

In an exemplary implementation consistent with the present invention, network operation center 130 may receive beacon EIRP variation estimates from a number of probing terminals 120. In this case, each probing terminal 120 estimates the EIRP variation as described above with respect to FIG. 6. Since the beacon EIRP variation is fixed for all terminals 120 and random errors are independent, taking the average EIRP variation gathered by multiple probing terminals 120 may further enhance the EIRP variation estimate by reducing effects from noise.

For example, assume that network operations center 130 has received an N-day long time trace from each of K probing terminals 120. In this case, network operations center 130 may determine the beacon EIRP variation using equation 7 below.

$$\delta EIRP(t) = \frac{1}{NK}\sum_{n=0}^{N-1}\sum_{k=0}^{K-1}\delta EIRP_k(t - nT),\quad\text{Equation (7)}$$

where $\delta EIRP_k(t)$ represents the beacon EIRP variation estimates received from the probing terminal k at time t and T is equal to 24 hours. In an exemplary implementation consistent with the present invention, the number of probing terminals may be relatively small. For example, the quantity of the N-day trace and the number of probing terminals K may be selected to be less than 100, i.e., NK≦100. In other implementations a single probing terminal (i.e., K=1) may be used.

In an exemplary implementation consistent with the present invention, the desired noise compression associated with the estimated δEIRP values from equation 7 above may be achieved by selecting the appropriate time constants of mid-term filter 370 and short term filter 320, using a desired number of probing terminals 120 and generating an appropriate number of N-day time traces. For example, equation 8 below allows the δEIRP(t) result to achieve noise suppression of a factor of 10 (i.e., reduce the standard deviation of the noise component by a factor of 10) relative to the output of short term filter 320.

$$NK\frac{\tau_m}{\tau_s} \approx 100, \quad \text{Equation (8)}$$

where N represents the number of day long time traces of δEIRP estimates, K represents the number of probing terminals 120, $\tau_m$ represents the time constant of mid-term filter 370, $\tau_s$ represent the time constant of short term filter 320.

For example, the following two cases below labeled 1 and 2 allow the δEIRP value to achieve noise reduction by a factor of 10.

$$N = 1, K = 1, \frac{\tau_m}{\tau_s} = 100 \quad 1)$$

$$N = 1, K = 10, \frac{\tau_m}{\tau_s} = 10 \quad 2)$$

However, as discussed in more detail below, case 2 may result in less distortion.

Network operations center 130 may then compensate the estimated ΔC/N values (received at act 710) to include effects of beacon power variation using the δEIRP information (act 730). For example, network operations center 130 may adjust the ΔSNR generated by terminal 120 using equation 9 below.

$$\Delta SNRC_k(t) = \Delta SNR_k(t) - \delta EIRP(t) \quad \text{Equation (9)},$$

where ΔSNRC represents the compensated ΔSNR value, $\Delta SNR_k(t)$ represents the ΔSNR values from terminal k and δEIRP(t) represents the average beacon power variation determined at equation 8 above. In this manner, the ΔSNRC value compensates for beacon power variations prior to being used for weather classification.

Network operations center 130 may then use the ΔSNRC value from equation 9 above to identify fade conditions (i.e., conditions where the signal strength has been reduced due to rain or other non-clear sky conditions). Network operations center 130 may then use the data to signal satellite 110 to alter its downlink power level (act 740). For example, network operations center 130 may determine that fade in a particular cell area is a relatively deep fade (e.g., more than 1 dB). In this case, network operations center 130 may signal satellite 110 to increase the power level associated with transmitting downlink messages in that cell.

In this manner, network operations center 130 is able to gain an accurate assessment of network conditions and is able to control satellite 110 according to the actual conditions. In addition, calculating the variations in beacon power in the manner described above, as opposed to using a predetermined value to estimate beacon power variations, allows for improved accuracy and more efficient use of the power resources of satellite 110. For example, if a predetermined value was used to estimate beacon power variations, the value would be selected to cover a worst case scenario (i.e., a high margin value would be selected). Compensating the ΔSNR value in equation 9 above using a higher margin than is necessary may lead to increasing downlink power levels when the actual network conditions may not warrant the increase. In satellite systems that are fully loaded, every tenth of a dB of power savings may be important. Therefore, accurately estimating beacon power variations greatly improves downlink power control efficiency.

As an example, assume that K=1 (one probing terminal) and N=1 (no time averaging). In this case, a relatively large time constant (e.g., 30 minutes) may be used for mid-term filter 370 to ensure sufficient random noise suppression. Since large random noise reduction may be achieved in this manner (more than a factor of 10), the performance may be determined by the distortion associated with mid-term filter 370. Therefore, in this example, only a deterministic noise component is input to mid-term filter 370, without adding the random noise. In addition, it should be noted that the standard deviation of the random noise component of short term filter's 320 output may be about 0.1 dB and that of the mid-term filter 370 may be less than 0.01 dB.

Figure 8:
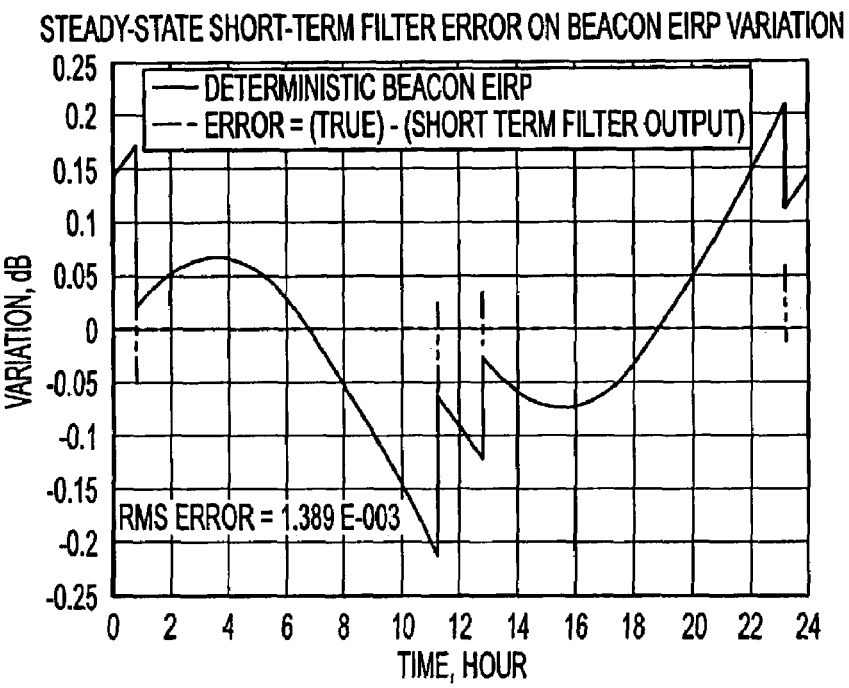
FIGS. 8–12 illustrate exemplary graphs of filter error, filter response and beacon power variation error in exemplary implementations consistent with the present invention.
Figure 9:
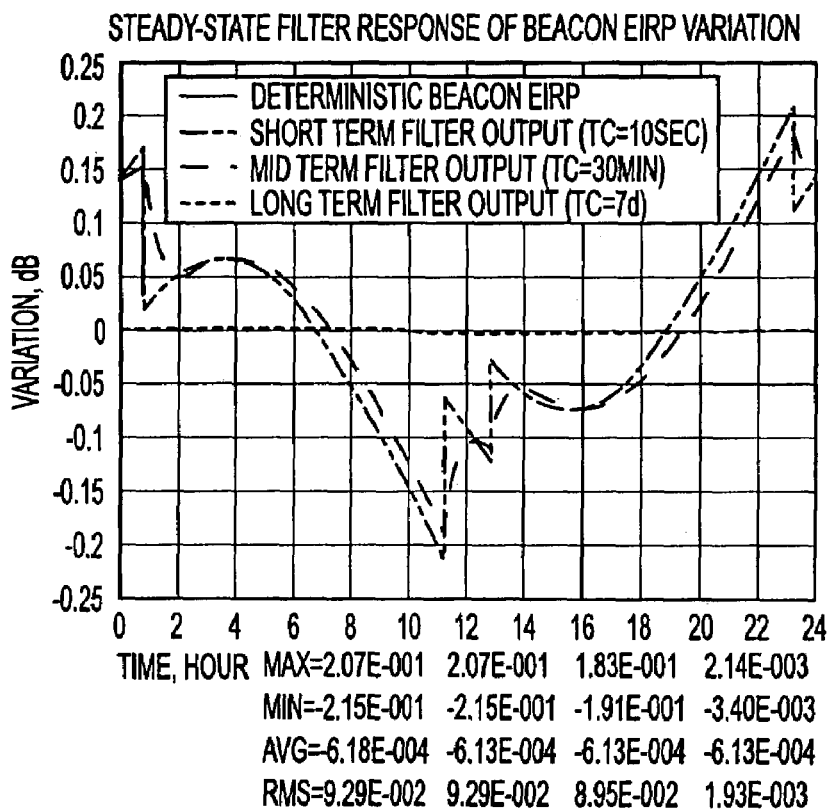

FIG. 8 illustrates the steady-state short term filter 320 error on beacon EIRP variation. As illustrated in FIG. 8, the short term filter's 320 output follows the beacon EIRP variation very closely in the absence of random noise with a root means square (RMS) error of about 0.001 dB. FIG. 9 illustrates the steady state filter response on beacon EIRP variation. As illustrated in FIG. 9, mid-term filter 370 yields the distortion at the sharp transition points due to its larger time constant. This is reason why the second case discussed above (i.e., N=1, K=10, $$\frac{\tau_m}{\tau_s} = 10),$$

may yield better overall performance than the situation where N=1 and K=1. In other words, in order to obtain better overall performance, the distortion of mid-term filter 370 may be kept small while random noise is sufficiently suppressed. Therefore, using a smaller mid-term filter 370 time constant (e.g., 10 minutes or less) and compressing the noise using a number of probing terminals 120 and time averaging (N day-long time traces) may improve the results. For example, in one implementation of the present invention, using a time constant of 100 seconds for mid-term filter 370, 10 probing terminals 120 and 2-day averaging has been found to enable network operations center 130 to generate a reliable EIRP variation estimate with minimal effects from noise. It should be understood, however, that when only one probing terminal is used, a large mid-term filter 370 time constant provides a performance gain.

Figure 10:
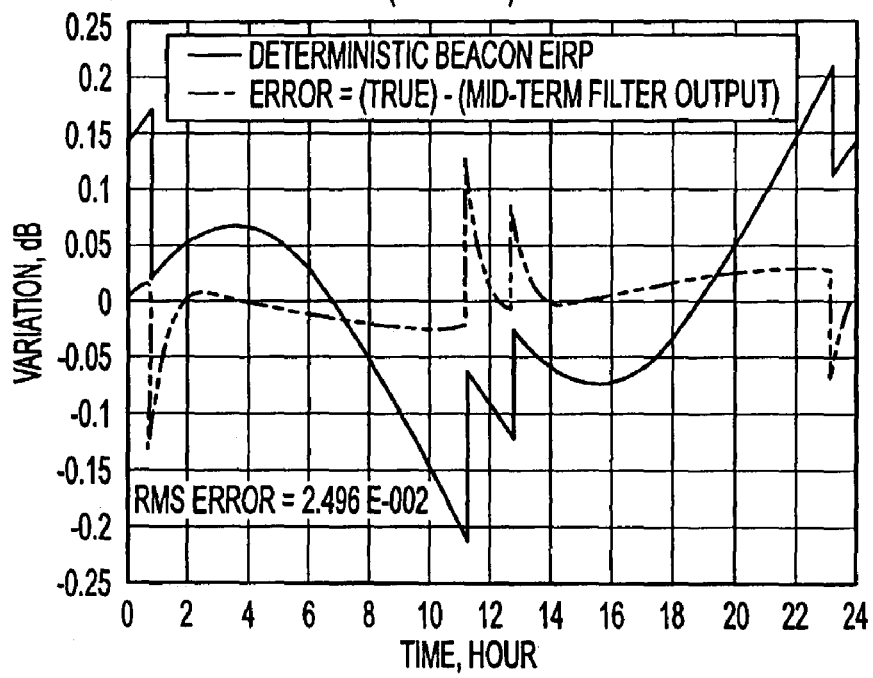
Figure 11:
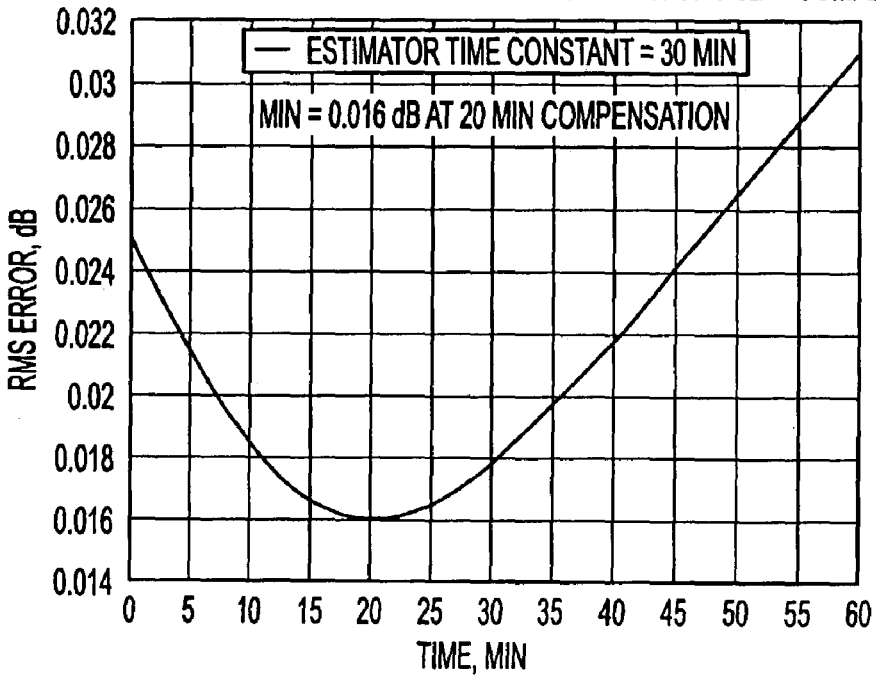

FIG. 10 illustrates the steady-state mid-term filter 370 error on beacon EIRP variation. As illustrated in FIG. 10, the RMS error of the mid-term filter 370 may be about 0.025 dB when the filter delay is not compensated. For example, each filter has its own delay, i.e., the output signal of the filter at time t is the filter response to the input signal at time $t-T_{delay}$, where $T_{delay}$ is the filter delay. In some cases, the filter delay may be close to the filter's time constant. For example, the mid-term filter's 370 delay may be about 30 minutes in the example above in which the 30 minute time constant was used. Large filter delay, if not compensated, may produce a large RMS error, since the signal is not constant over the delay period. In the case discussed above, minimum RMS error may be achieved when the mid-term filter's 370 output is advanced by, for example, 20 minutes when computing RMS error against the input signal. This can be compared against the RMS value of the short term filter 320 output of about 0.093 dB (FIG. 9), which can be interpreted as the RMS error when no attempt is made to compensate the beacon EIRP variation (a 73% reduction). By properly compensating for the delay of mid-term filter 370, the RMS error can be reduced to 0.016 dB as shown in FIG. 11. As illustrated in FIG. 11, a minimum RMS error may be achieved at a 20 minute delay. In this case, since the beacon EIRP variation is stationary, the mid-term filter 370 output can be delayed by 23 hours and 40 minutes.

Figure 12:
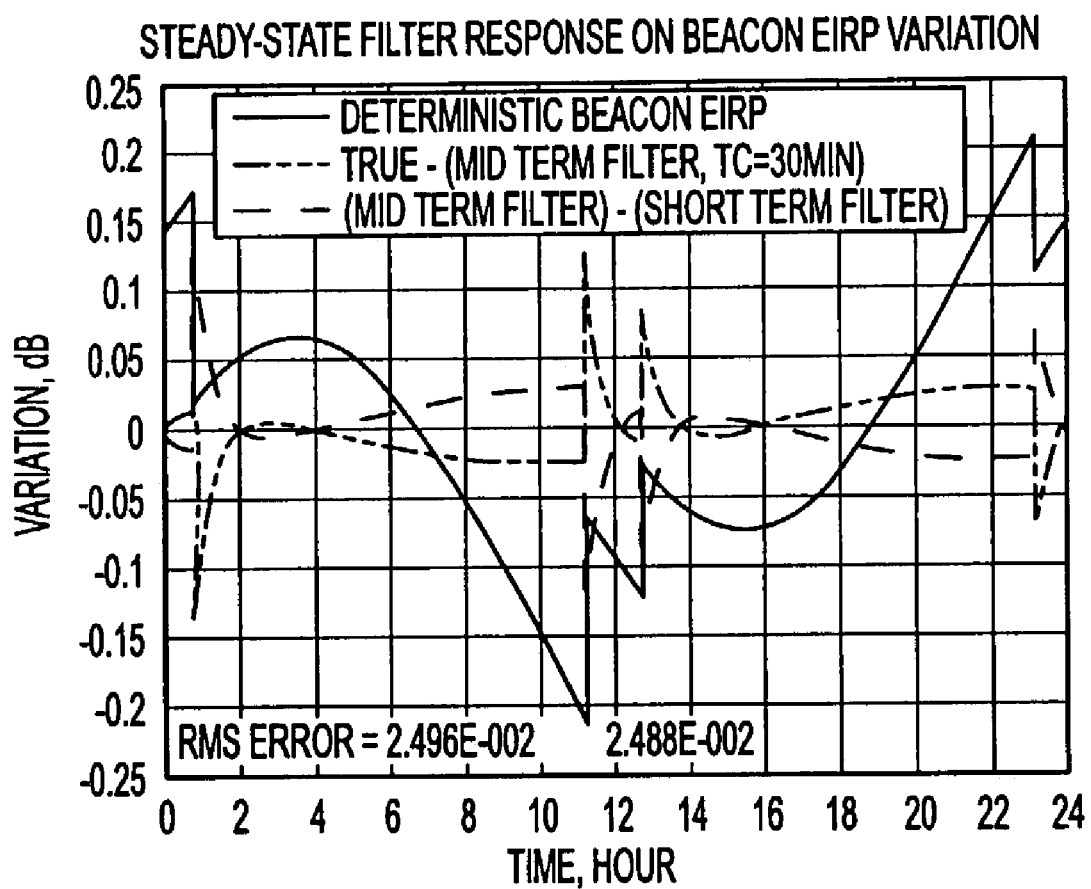

FIG. 12 illustrates the steady-state filter response on beacon EIRP variation versus time. As illustrated in FIG. 12, there is little difference between the mid-term filter's 370 RMS error and the beacon EIRP variation compensator's RMS error (mid-term minus short-term).

Systems and methods consistent with the present invention estimate beacon EIRP variations. The beacon EIRP variations may then be taken into consideration during downlink power control related processing. An advantage of the present invention is that ΔC/N levels received from satellite terminals 120 may be adjusted based on the EIRP variations. This enables an entity, such as network operations center 130, to more efficiently use the power resources of satellite 110. In addition, the performance may be optimized based on the particular system requirements by choosing appropriate parameters, such as the particular time constants, the number of probing terminals and time averaging. Hence more efficient downlink power control can be provided to increase the system capacity.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, while series of acts have been described with respect to FIGS. 5–7, the order of the acts may be modified in other implementations consistent with the present invention. Moreover, non-dependent acts may be performed in parallel. In addition, the present invention has been described as using particular equations to filter C/N values, linearize the C/N values and average beacon power variation information. It should be understood that other statistical methods may also be used in other implementations of the invention. Further, the present invention has been described as measuring power variations in beacon signals transmitted from a satellite. It should be understood that other signals transmitted from the satellite may be used to estimate EIRP variations for signals received by earth-based terminals. These EIRP variations may then be used in downlink control related processing.

No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed is:

1. A device, comprising:
    a receiver configured to receive beacon signals transmitted from a satellite;
    at least one logic device coupled to the receiver and comprising:
        a carrier-to-noise (C/N) calculator configured to calculate C/N values associated with the beacon signals,
        a first filter configured to filter the C/N values to generate a first output,
        a second filter configured to filter the C/N values to generate a second output, and
        a beacon variation estimator configured to determine a difference between the first output and the second output, wherein the difference represents an estimated beacon power variation; and
    a transmitter coupled to the at least one logic device, and
    wherein the beacon variation estimator is further configured to forward the difference between the first output and the second output to the transmitter at predetermined intervals, and
    wherein the transmitter is configured to transmit the difference to an entity associated with controlling the satellite.

2. A device, comprising:
    a receiver configured to receive beacon signals transmitted from a satellite;
    at least one logic device coupled to the receiver and comprising:
        a carrier-to-noise (C/N) calculator configured to calculate C/N values associated with the beacon signals,
        a first filter configured to filter the C/N values to generate a first output,
        a second filter configured to filter the C/N values to generate a second output, and
        a beacon variation estimator configured to determine a difference between the first output and the second output, wherein the difference represents an estimated beacon power variation; and
    a memory, and
    wherein the beacon variation estimator is further configured to determine the difference between the first output and the second output at predetermined intervals, store the differences determined over a predetermined period of time in the memory, and forward a time trace of estimated beacon power variations to an entity associated with controlling the satellite.

3. A method for estimating beacon power variations, comprising:
    receiving a plurality of beacon signals transmitted from a satellite over a period of time;
    measuring a carrier-to-noise (C/N) value for each of the plurality of beacon signals;
    filtering the C/N values using a first filtering process;
    determining a difference between an output of the first filtering process and a clear sky reference value, the difference representing an estimated beacon power variation;
    filtering the C/N values with a second filtering process, wherein an output from the second filtering process taken after a predetermined period of time represents the clear sky reference value, wherein the determining a difference comprises determining a difference between the output of the first filtering process and the output of the second filtering process at predetermined intervals;
    storing the estimated beacon power variations determined at the predetermined intervals; and
    transmitting the estimated beacon power variations to an entity associated with controlling a power level with which the satellite transmits data.

4. The method of claim 3, further comprising:
    receiving, by the entity associated with controlling the power level, the estimated beacon power variations; and adjusting an estimated C/N ratio determined for at least one cell area using the estimated beacon power variations.

5. The method of 3, further comprising:
using the estimated beacon power variations in downlink power control related processing.

6. The method of claim 3, further comprising:
receiving, by the entity associated with controlling the power level, the estimated beacon power variations;
receiving, by the entity associated with controlling the power level, estimated C/N ratios of the beacon signals generated by a number of earth-based satellite terminals, the estimated C/N ratios representing variations from a clear sky C/N value;
averaging the estimated C/N ratios for at least one cell area;
averaging the estimated beacon power variations;
subtracting the averaged beacon power variations from the averaged C/N ratios to generate an adjusted C/N ratio for the at least one cell area; and
using the adjusted C/N ratio in downlink power control related processing for the at least one cell area.

7. A computer-readable medium having stored thereon a plurality of sequences of instructions which, when executed by at least one processor, cause the at least one processor to:
receive a plurality of carrier-to-noise (C/N) values representing beacon C/N values;
filter the plurality of C/N values using a first filtering process;
determine a difference between an output of the first filtering process and a clear sky reference value, the difference representing an estimated beacon power variation; and
filter the C/N values with a second filtering process, wherein an output from the second filtering process taken after a predetermined period of time represents the clear sky reference value; and
wherein when determining a difference, the instructions cause the at least one processor to determine a difference between the output of the first filtering process and the output of the second filtering process at predetermined intervals, and the instructions further cause the at least one processor to store the estimated beacon power variations determined at the predetermined intervals and time information indicating when the estimated beacon power variations were determined.

8. The computer-readable medium of claim 7, wherein the instructions further cause the at least one processor to:
transmit the estimated beacon power variations and the time information to an entity associated with controlling a satellite associated with the beacon C/N values.

9. A computer-readable medium having stored thereon a plurality of sequences of instructions which, when executed by at least one processor, cause the at least one processor to:
receive a plurality of carrier-to-noise (C/N) values representing beacon C/N values;
filter the plurality of C/N values using a first filtering process;
determine a difference between an output of the first filtering process and a clear sky reference value, the difference representing an estimated beacon power variation; and
transmit the estimated beacon power variation to a entity associated with controlling a satellite associated with the beacon C/N values.

10. A device for estimating beacon power variations, comprising:
a receiver configured to receive a plurality of beacon signals transmitted from a satellite;
logic coupled to the receiver, the logic configured to estimate carrier-to-noise (C/N) values associated with the plurality of beacon signals, filter the C/N values with at least a first filter and a second filter, the second filter representing a long term filter with respect to the first filter, and compare outputs from the first and second filters at predetermined intervals to estimate beacon power variations; and
a transmitter coupled to the logic, wherein the logic is further configured to forward the estimated beacon power variations to the transmitter, and wherein the transmitter is configured to transmit the estimated beacon power variations to an entity associated with controlling the satellite.

11. A device for estimating beacon power variations, comprising:
a receiver configured to receive a plurality of beacon signals transmitted from a satellite;
logic coupled to the receiver, the logic configured to estimate carrier-to-noise C/N values associated with the plurality of beacon signals, filter the C/N values with at least a first filter and a second filter, the second filter representing a long term filter with respect to the first filter, and compare outputs from the first and second filters at predetermined intervals to estimate beacon power variations;
a memory configured to store the estimated beacon power variations and time stamp information; and
a transmitter configured to transmit the estimated beacon power variations and time stamp information to an entity associated with controlling the satellite.

12. A method for estimating power variations for signals transmitted from a satellite, comprising:
receiving a plurality of beacon signals at an earth-based terminal;
estimating carrier-to-noise (C/N) values associated with the plurality of beacon signals;
filtering the C/N values to generate a first output;
comparing the first output with a clear sky C/N reference value at predetermined intervals to generate beacon power variation information;
storing the beacon power variation information and time stamp information; and
transmitting the stored beacon power variation information and time stamp information to an entity associated with controlling the satellite.

13. The method of claim 12, wherein the beacon power variation information represents effective isotropic radiated power (EIRP) variations, the method further comprising:
determining, by the entity associated with controlling the satellite, a difference between the clear sky C/N reference value and a current C/N value; and
adjusting the difference based on the EIRP variations.

14. The method of claim 13, wherein the adjusting comprises:
averaging the EIRP variations over a period of time, and
subtracting the averaged EIRP variations from the difference.

* * * * *